United States Patent
Murphy et al.

(10) Patent No.: US 7,051,529 B2
(45) Date of Patent: May 30, 2006

(54) SOLAR DISH CONCENTRATOR WITH A MOLTEN SALT RECEIVER INCORPORATING THERMAL ENERGY STORAGE

(75) Inventors: Terrence H. Murphy, Westlake Village, CA (US); William D. Otting, Thousand Oaks, CA (US); Patrick E. Frye, Simi Valley, CA (US)

(73) Assignee: United Technologies Corporation, Hartford, CT (US)

( * ) Notice: Subject to any disclaimer, the term of this patent is extended or adjusted under 35 U.S.C. 154(b) by 523 days.

(21) Appl. No.: 10/324,510

(22) Filed: Dec. 20, 2002

(65) Prior Publication Data
US 2004/0118449 A1   Jun. 24, 2004

(51) Int. Cl.
*B60K 16/00*   (2006.01)
(52) U.S. Cl. .............. 60/641.8; 60/641.11; 60/641.15
(58) Field of Classification Search .............. 60/641.8, 60/641.11, 641.15
See application file for complete search history.

(56) References Cited

U.S. PATENT DOCUMENTS

| | | | | |
|---|---|---|---|---|
| 4,064,867 A | * | 12/1977 | Schlesinger | 126/587 |
| 4,444,024 A | * | 4/1984 | McFee | 62/401 |
| 4,446,041 A | * | 5/1984 | Neary | 252/70 |
| 4,672,948 A | * | 6/1987 | Rosende | 126/600 |
| 6,701,711 B1 | * | 3/2004 | Litwin | 60/641.11 |

OTHER PUBLICATIONS

Price, Hank & David Kearney, Parabolic-Trough Technology Roadmap: A Pathway for Sustained Commercial Development and Deployment of Parabolic Trough Technology, Jan. 1999; Report No. NREL/TP-55024748.

Wood, James G, Neill W. Lane & William T. Beale, Preliminary Design of a 7kWe Free-Piston Stirling Engine with Rotary Generator Output, Sep. 24, 2001, Proceedings of the 10th International Stirling Engine Conference.

Leitner, Arnold, Fuel from the Sky: Solar Power's Potential for Western Energy Supply, Jul. 2002; NREL/Bk-550-32160.

Sandia National Laboratory,Overview of Solar Thermal Technologies.

* cited by examiner

*Primary Examiner*—Hoang Nguyen
(74) *Attorney, Agent, or Firm*—Harness Dickey & Pierce P.L.C.

(57) ABSTRACT

A solar power system capable of storing heat energy and converting sun light to electrical power. The solar power system includes a solar collection system which gathers and transmits concentrated solar energy to an absorber/cavity. The thermal energy is extracted from the absorber/cavity via a fluid and transported to a heat conversion system. The heat conversion system uses the thermal energy to create electricity.

25 Claims, 2 Drawing Sheets

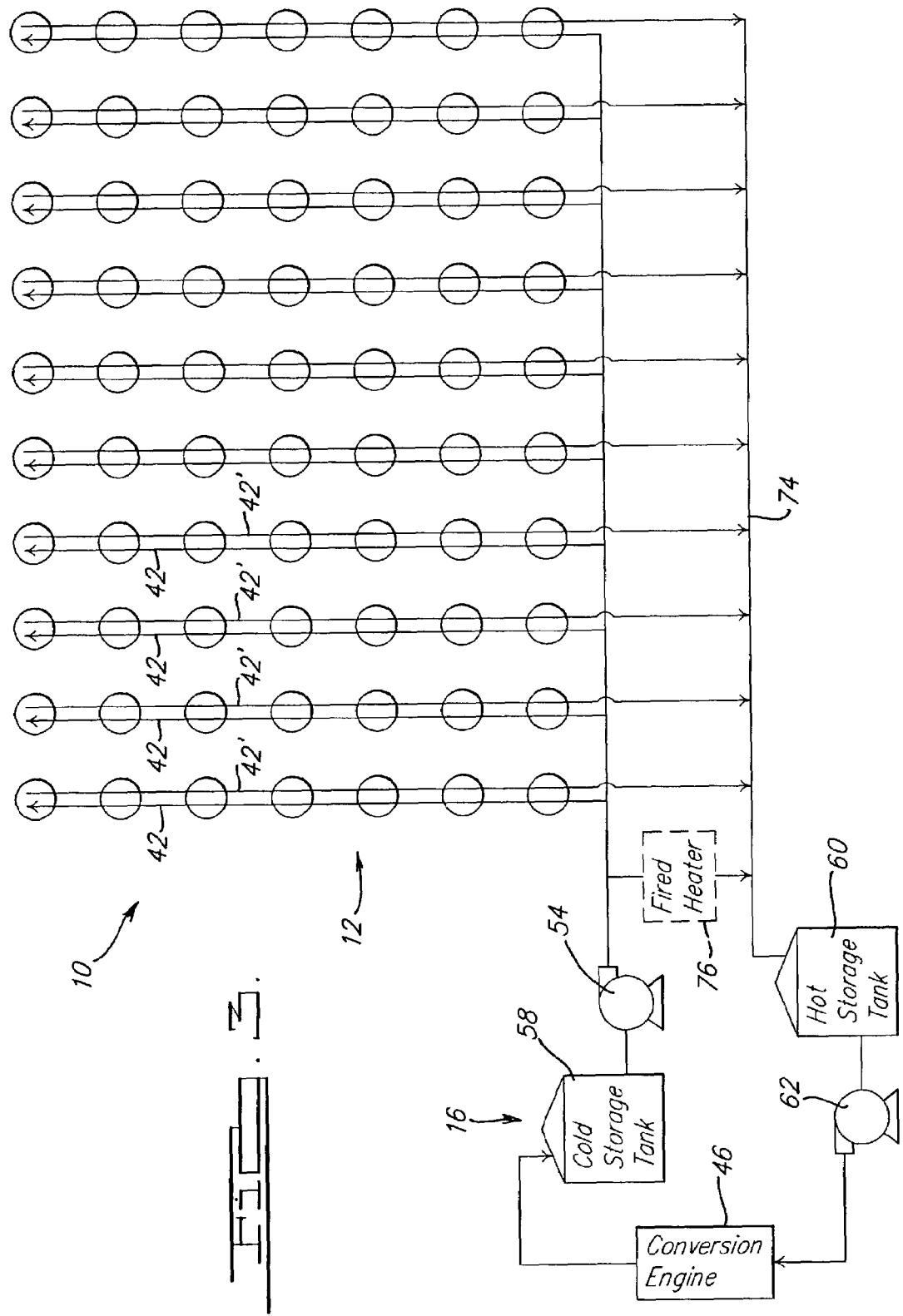

SOLAR DISH CONCENTRATOR WITH A MOLTEN SALT RECEIVER INCORPORATING THERMAL ENERGY STORAGE

FIELD OF THE INVENTION

The present invention relates to the field of electrical energy generation through solar power collection, and more particularly, to electrical energy generation using an absorber with solar dish concentrators and a molten salt receiver with thermal storage capability.

BACKGROUND OF THE INVENTION

The desire to decrease and ultimately eliminate dependence on fossil fuels has stimulated research into clean and renewable ways to produce electricity for the global marketplace. Solar power has become a viable option because it is a clean form of energy production and there is a potentially limitless supply of solar radiation. To that end, it is estimated the solar energy flux from the sun is approximately 2.7 megawatt-hours per square meter per year in certain advantageous areas of the world. With this tremendous amount of free and clean energy available, and the desire to reduce dependence on fossil fuels, solar power production is now, more than ever, being reviewed as an important means to help meet the energy consumption demands in various parts of the world.

Technological innovations and improvements have helped to make terrestrial solar power generation a feasible means for large scale power production. More specifically, the reduction in the magnitude of capital investment required and the reduction in recurring operation and maintenance costs allow solar power generation to compete with other forms of terrestrial power generation. Further, the scalability of solar power plants has the potential to enable smaller facilities to be constructed, with production capacity on the order of ten kilowatts, for communities with smaller demands, and larger facilities, capable of producing one hundred megawatts or more, for large metropolitan areas with higher energy demands.

To address the above demand for solar power systems many configurations have been designed and implemented. One such implementation is a concentrated solar power system that collects solar energy and concentrates that energy onto an absorber. The absorbed optical energy is carried away from the absorber by a fluid, for example molten salt, and then pumped to a power conversion system. The power conversion system then produces electricity that is eventually fed into the national electrical grid. After the fluid leaves the power conversion system it is then pumped back to the absorber.

A typical concentrated solar power system uses a fluid to transport absorbed heat energy from a heat receiver to a heat-to-electricity conversion system. A fluid with significant thermal capacitance, typically molten salt, is used to allow storing collected energy as sensible heat in the fluid. The ability to store energy allows separating the energy collection and energy production functions so that energy can be produced during periods of high demand, even nighttime, while energy collection is conducted when sufficient sunlight is available. This significantly enhances the economics of the power plant. The energy collection typically includes a central receiver/absorber surrounded by a large field of heliostats. The central receiver is typically a tall cylindrical tower made up of multiple absorber tubes. The heliostats intercept the incident solar energy and reflect it to the absorber tubes making up the receiver tower. The reflected energy is absorbed on the absorber tubes while molten salt flowing on the inside of the tubes is used to transport the absorbed energy effectively cooling the absorber tubes. The energy contained in the molten salt, as sensible heat, can then be used to drive a heat engine. Although this system has the advantage of thermal energy storage via the molten salt, the system has low energy collection efficiency due to inefficiencies in the heliostat optical system and from heat losses off the large open-air receiver/absorber. Conversely, point focus solar power systems, typically using a parabolic dish concentrator coupled to an absorber cavity, have high solar energy collection efficiency and are capable of achieving higher temperatures. However, typical implementation of this system provides direct conversion of the absorbed energy to electricity via a thermal engine, for example a Stirling engine, coupled directly to the absorber cavity. There is no energy storage capability, therefore, the economics of this system suffer because the energy production cannot be optimized to follow the energy demand.

Accordingly, a need exists for a solar power generation system capable of efficient energy collection, with high temperature capability, and with the ability to store collected energy so that electrical energy production can be optimized to follow periods of high power demand.

SUMMARY OF THE INVENTION

The present invention is directed to a solar power system capable of storing heat energy wherein sun light is converted to electrical energy. The solar power system includes a solar collection system and power conversion system. The solar collection system has a concentrator which reflects the sunlight onto an absorber. The concentrated sunlight enters the absorber through an aperture and warms a receiving cavity inside the absorber. A heat exchanger is coupled to the absorber and transfers the heat from the receiving cavity to a fluid.

The power conversion system has a pump system which circulates the fluid. A first pump impels the fluid from a cold storage tank to the heat exchanger/absorber. The heat exchanger transfers the thermal energy from the sunlight to the fluid. A hot storage tank receives the fluid from the heat exchanger/absorber. A second pump pumps the fluid to the heat engine and then back to the cold fluid reservoir. The heat engine converts the heat to electricity.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a sectional perspective view of the solar power system of FIG. 1 along line 2—2; and FIG. 3 is a schematic of a solar power system having multiple collection systems according to the teachings of the present invention.

DETAILED DESCRIPTION OF THE PREFERRED EMBODIMENTS

Figure 1:
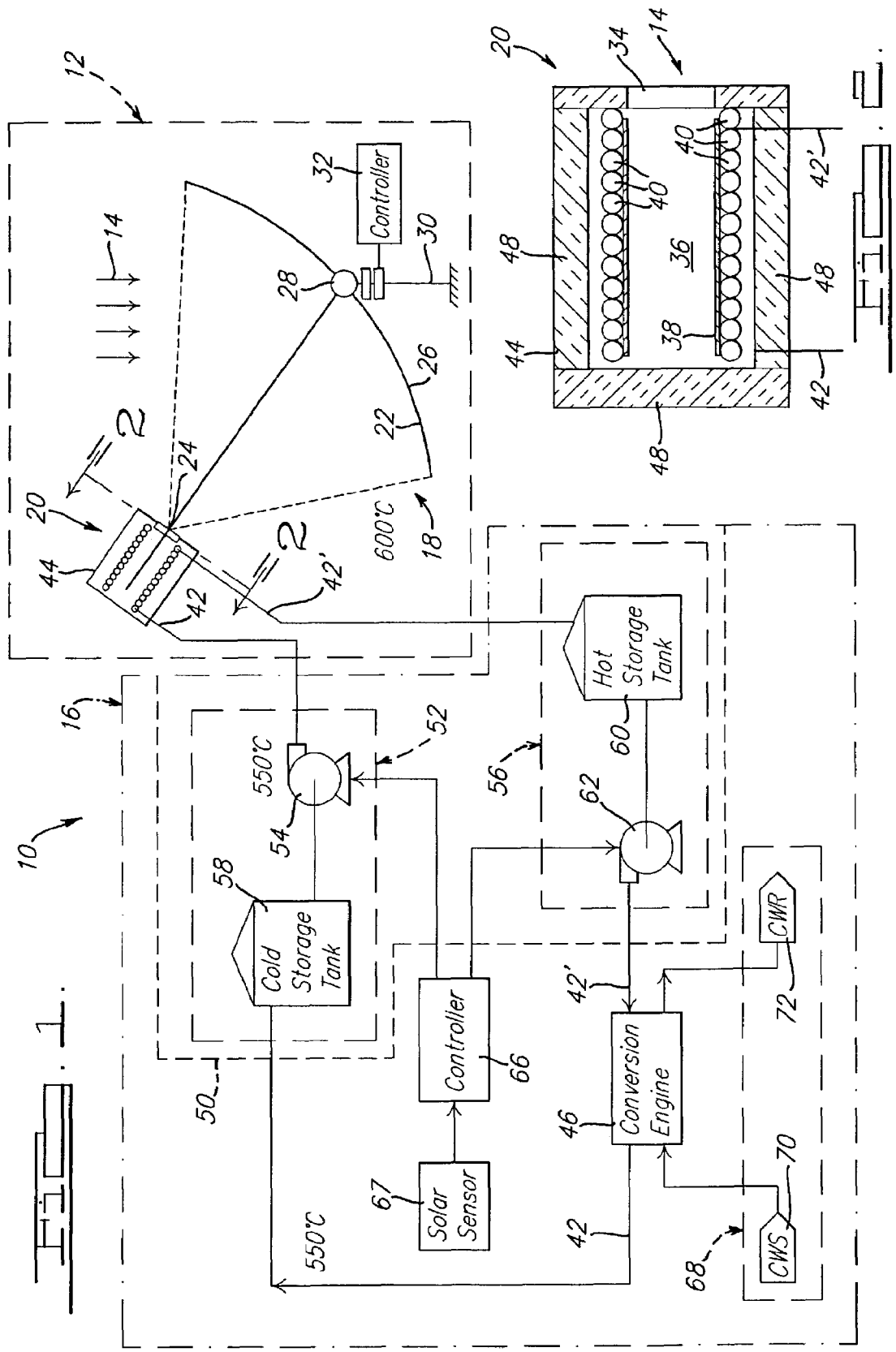
FIG. 1 is a schematic of a solar power system according to a preferred embodiment of the present invention.

The following description of the preferred embodiments is merely exemplary in nature and is in no way intended to limit the invention, its application, or uses.

With reference to FIG. 1, a solar power system 10 in accordance with a preferred embodiment of the present invention is shown. The solar power system 10 includes a solar collection system 12. The solar collection system 12 gathers sunlight 14 and concentrates the sunlight 14 before transmitting the solar energy from the sunlight 14 to a power conversion system 16. The power conversion system 16 uses the thermal energy from the solar collection system 12 to create electricity.

The solar collection system 12 has a solar concentrator system 18. The solar concentrator system 18 gathers sunlight 14 and concentrates the sunlight 14 before transferring the solar energy from the sunlight 14 to an absorber system 20.

The solar concentrator system 18 includes a mirror 22. In one preferred form, the mirror 22 is generally dish-shaped and parabolic. The sunlight 14 strikes the mirror 22 and is reflected to a focus 24 of the mirror 22. The mirror 22 is coupled to a support structure 26 that supports the mirror 22. The support structure 26 is further coupled to a pivot assembly 28. The pivot assembly 28 is rotatably coupled to a base 30. The base 30 is affixed to a ground surface as shown. The pivot assembly 28 enables the mirror 22 to be adjusted to track the sun as the sun travels across the sky. Specifically, the pivot assembly 28 provides two axes of rotation for the mirror 22, as known in the art. A controller 32 coupled to the solar concentrator system 18 controls the pivot assembly 28 so that it causes the mirror 22 to track the sun across the sky. More specifically, the controller 32 drives a motor (not shown) associated with the pivot assembly 28 to pivot mirror 22 as needed.

The sunlight 14 is reflected from the solar concentrator system 18 to the absorber system 20 as shown in FIG. 2. The concentrated sunlight 14 enters the absorber system 20 through an aperture 34 therein. The reflected sunlight 14 passes through the aperture 34 into a receiving cavity 36. The receiving cavity 36 is lined with an absorptive material 38. The absorptive material 38 absorbs the solar energy and aids in the distribution of the resulting thermal energy to a plurality of heat exchanger tubes 40. The absorptive material 38 may include, for example, castable refractory brick, graphitic absorbers or heat pipe absorbers. The heat exchanger tubes 40 are of the radiant absorber-to-liquid type and, in this embodiment, are preferably constructed of Inconel® alloy or other suitable alloys, and may be configured as a straight or coiled tube. The heat exchanger tubes 40 receive the thermal energy from the absorption of concentrated sunlight 14 and transfer the energy into a fluid 42. The fluid 42 is retained and flows within the heat exchanger tubes 40. In this embodiment, the fluid 42 is a 60/40 mixture of sodium and potassium nitrate, however, the fluid 42 could also be a liquid metal such as, for example, sodium, lithium, or potassium. The heat exchanger tubes 40 are surrounded by an insulation layer 48 that reduces heat loss to the atmosphere. In particular, high wind speed contributes to heat loss, as the high winds produce convective losses. The insulation layer 48, however, enables the heat exchanger tubes 40 to maintain temperature even if the sunlight 14 has diminished or the heat exchanger tubes 40 are exposed to high winds. The insulation layer 48 may include for example, microtherm or other similar form of bulk insulation.

In addition, the aperture 34, receiving cavity 36 and heat exchanger tubes 40 can be shielded with conventional heat protectors (not shown). The heat protectors allow the aperture 34, receiving cavity 36 and heat exchanger tubes 40 to withstand transient misalignments of the mirror 22 due to winds and operational vibration. Thus, if the focus 24 not aimed directly at the receiving cavity 36, it will not burn or melt the aperture 34, receiving cavity 36 or heat exchanger tubes 40.

The fluid 42 of the absorber system 20 transports thermal energy to the power conversion system 16. The power conversion system 16 receives thermal energy from the solar collection system 12 via the fluid 42. The power conversion system 16 includes a conversion engine 46 and a pump system 50. The fluid 42 from the solar collection system 12 is transported to the conversion engine 46 via the pump system 50.

The pump system 50 circulates the fluid 42 through both the solar collection system 12 and the power conversion system 16. The pump system 50 has a cold storage system 52 and a hot storage system 56. The cold storage system 52 provides cooled fluid 42 at a temperature of preferably about 550° C. (1022° F.) to the solar collection system 12 for heating. The cold storage system 52 includes a first pump 54. The first pump 54 is a centrifugal pump which pumps cooled fluid 42 from a cold storage tank 58 into the absorber system 20. The hot storage system 56 collects and stores hot fluid 42' from the absorber system 20 and supplies hot fluid 42' at a temperature of about 600° C. (1122° F.) to the power conversion system 16. As the hot fluid 42' exits the absorber system 20, it flows into a hot storage tank 60 of the hot storage system 56. The hot storage tank 60 may be modified to increase the thermal capacity by, for example, placing rocks therein. The hot fluid 42' is removed from the hot storage tank 60 by a second centrifugal pump 62.

In this embodiment, the first and second pumps 54, 62 are commercially available fluid pumps. One source is Nagle Pumps, Inc. of Chicago Heights, Ill. The first pump 54, pumps the fluid 42 at a flow rate commensurate with the current solar condition. The second centrifugal pump 62, pumps the fluid 42 consistent with the heat demand of the power conversion system 16. The first pump 54 and second centrifugal pump 62 receive control inputs from a controller 66. The controller 66 determines if the first pump 54 should operate based upon the output of a solar sensor 67 and upon the output of temperature sensors (not shown) located in or around the receiving cavity 36. The temperature sensors measure the temperature of the hot fluid 42' at the exit of the receiving cavity 36. If the controller 66 determines a solar power generation condition exists (i.e. the sun is out), the controller 66 enables the first pump 54. The first pump 54 then pumps the cold fluid 42 into the absorber system 20 for heating. The controller 66 also determines if the second centrifugal pump 62 should be enabled based upon the present power demand. If the controller 66 receives a signal indicating a high demand for power, the controller 66 enables the second centrifugal pump 62 to pump the hot fluid 42' from the hot storage tank 60 into the conversion engine 46.

The conversion engine 46 uses the thermal energy to create electricity. The conversion engine 46 may comprise any engine capable of converting thermal energy into electricity, such as, for example, a Stirling engine, a Rankine engine or a Brayton engine. In applications requiring low scale energy productions, a Stirling engine would be most suitable. Conversely, in large scale production, a Rankine engine would be more desirable.

The waste heat from the power conversion system 16 is removed by a cooling water system 68. The cooling water system 68 consists of a cooling water supply 70 and a cooling water return 72. The cooling water system 68 provides the cooling water at a flow rate necessary to remove the waste heat from the power conversion system 16 with a temperature rise commensurate with the cooling water utility being employed.

Alternatively, the solar power system 10 can be constructed with multiple solar concentrator systems 18 as shown in FIG. 3. The long rows of solar concentrator systems 18 are constructed with the absorber systems 20 disposed above them (not shown). A conduit 74 transports the fluid 42 to the power conversion system 16. A fired heater 76 may be added to facilitate startup and allow operation during periods of reduced solar insulation or to augment solar energy to accommodate power peaking requirements. One skilled in the art will readily appreciate that the solar power system 10 can be scaled to accommodate a wide range of demands for solar power.

In operation of the solar power system 10, if a solar power generation condition exists, the sunlight 14 strikes the mirror 22 of the solar concentrator system 18. The mirror 22 concentrates the sunlight 14 to the focus 24, which is essentially at the aperture 34. The sunlight 14 passes through the aperture 34 into the receiving cavity 36. The solar energy collected in the receiving cavity 36 is absorbed and the resulting thermal energy is transferred into the fluid 42 by the heat exchanger tubes 40. Simultaneously, the first pump 54 is pumping cool fluid 42 from the cold storage tank 58 into the absorber system 20. Upon receiving thermal energy via the heat exchanger tubes 40, the now, hot fluid 42' flows into the hot storage tank 60. If the controller 66 determines that a high power demand exists, the second centrifugal pump 62 pumps the hot fluid 42' into the conversion engine 46. The conversion engine 46 uses the thermal energy from the hot fluid 42' to generate electricity. The now cooled fluid 42 exits the conversion engine 46 and returns to the cold storage tank 58. This process will repeat as long as a solar power generation condition exists as determined by the controller 66.

If a solar power generation condition does not exist, electricity can still be generated for a high power demand condition. In this situation, the solar power system 10 will perform as previously discussed with the exception that the first pump 54 will not operate to pump cool fluid 42 into the absorber system 20. Hence, the only thermal energy available to the solar power system 10 is that in the hot storage tank 60. Conversely, if a solar power generation condition exists, thermal energy will still be generated and stored in preparation for a high power demand condition. In this situation, the the second centrifugal pump 62 will not be operated. The hot fluid 42' would then remain in the hot storage tank 60.

The solar power system 10 provides efficient collection of solar energy while being capable generating a higher temperature than current central receiver systems, resulting in a solar power system 10 that is more efficient than current central receiver systems. Additionally, the solar power system 10 has the ability to store the collected energy so that solar collection and electrical energy production functions can be separated and optimized. This enables the solar power system 10 to produce power according to the demand conditions which significantly improves the economic viability of current dish type systems, producing electricity at fewer dollars per kilowatt-hour than typical solar power systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solar power system capable of storing heat energy wherein sun light is converted to electrical energy comprising:
 a light conversion system having an absorber and a concentrator, said absorber having a heat exchanger, an aperture, and a receiving cavity; said concentrator having a mirror and a sun-tracking system; said concentrator reflects the sun light into said absorber through said aperture, wherein the sun light warms said receiving cavity disposed within said absorber; said heat exchanger transfers heat from said receiving cavity to a fluid;
 a heat conversion system having a hot segment and a cold segment; said cold segment having said heat exchanger, a cold fluid hold, and a cold fluid pump; said hot segment having a hot fluid hold, a hot fluid pump and a heat engine; said hot fluid hold receives said fluid from said heat exchanger; said hot fluid pump impels said fluid to said heat engine and then to said cold fluid hold, wherein said heat engine converts heat to electricity; said cold fluid pump impels said fluid from said cold fluid hold to said heat exchanger then to said hot fluid hold, wherein said heat exchanger transfers the heat to said fluid; said hot segment operates under a power-demand condition; and said cold segment operates under a sunlight condition.

2. A solar power system of claim 1, wherein said aperture is sized to reduce heat loss from said absorber.

3. A solar power system of claim 1, wherein said fluid is a mixture of Sodium and Potassium Nitrate.

4. A solar power system of claim 1, wherein said fluid is one of Lithium, Sodium, and Potassium.

5. A solar power system of claim 1, wherein said heat engine is one of a Steam Rankine engine, an Organic Rankine Engine, a Stirling Engine and a Brayton Cycle Engine.

6. A solar power system of claim 1, wherein additional thermal capacitance can be added to said hot fluid reservoir to increase thermal storage capability.

7. A solar power system of claim 1, wherein said heat exchanger is constructed of Inconel.

8. A solar power system of claim 1, wherein said concentrator is a dish-shaped parabolic.

9. A solar power system of claim 1, wherein said fluid resides in said hot fluid reservoir at 600° C.

10. A solar power system of claim 1, wherein said fluid resides in said cold fluid reservoir at 550° C.

11. A solar power system of claim 1, wherein said power demand condition can occur during periods without sun light.

12. A solar power system of claim 1, wherein said receiving cavity is coated with graphite or highly absorptive paint to increase solar absorption.

13. The solar power system of claim 8, wherein said dish concentrator reflects the sun light into a point focus.

14. The solar power system of claim 13, wherein said point focus is aligned with said aperture in said absorber.

15. A solar power system capable of storing heat energy wherein sun light is converted to electrical energy comprising:

an absorber having a receiver cavity, an aperture and a heat exchanger, said aperture disposed within a wall of said cavity and allowing the sun light to pass into said receiver cavity, said heat exchanger disposed within said receiver cavity, wherein the sun light passes through said aperture and contacts said heat exchanger, wherein said heat exchanger absorbs the heat energy from the sun light, wherein said heat exchanger has a hot end and a cold end;

a dish concentrator that reflects the sun light into a focus having a sun-tracking system to maintain said dish concentrator aligned with the sunlight;

a hot fluid reservoir storing a fluid at a hot-route temperature, said hot fluid reservoir is fluidly connected to said hot end of said heat exchanger;

a first fluid pump, wherein said first fluid pump impels said fluid from said hot fluid reservoir to a power conversion system; said power conversion system extracts the heat energy from said fluid and converts the heat energy to electrical energy, wherein said fluid enters said power conversion system at said hot-route temperature and exits at a cold-route temperature;

a cold fluid reservoir storing said fluid at said cold-route temperature; said cold fluid reservoir is fluidly connected to the power conversion system;

a second fluid pump, wherein said second fluid pump impels said fluid from said cold fluid reservoir to said cold end of said heat exchanger.

16. The solar power system of claim 15, wherein said dish concentrator reflects the sun light into a point focus.

17. The solar power system of claim 15, wherein said focus is aligned with said aperture in said absorber.

18. A solar power system of claim 15, wherein said aperture is sized to reduce heat loss from said absorber.

19. A solar power system of claim 15, wherein said fluid is a mixture of Sodium and Potassium Nitrate.

20. A solar power system of claim 15, wherein said power conversion system is one of a Steam Rankine engine, an Organic Rankine Engine, a Stirling Engine and a Brayton Cycle Engine.

21. A solar power system of claim 15, wherein additional thermal capacitance can be added within said hot fluid reservoir to increase thermal storage capability.

22. A solar power system of claim 15, wherein said heat exchanger is constructed of Inconel.

23. A solar power system of claim 15, wherein said hot-route temperature is about 600° C.

24. A solar power system of claim 15, wherein said cold-route temperature is about 550° C.

25. A solar power system of claim 15, wherein said receiving cavity is coated with graphite or highly absorptive paint to increase absorption.

* * * * *